United States Patent [19]

Johnson et al.

[11] Patent Number: 4,909,947

[45] Date of Patent: * Mar. 20, 1990

[54] PROCESS FOR DETOXIFYING HIGH AQUEOUS CONTENT HAZARDOUS WASTE STREAMS

[75] Inventors: Russell W. Johnson, Elmhurst; Karl J. Youtsey, Glenview; David G. Hughes, Highland Park, all of Ill.

[73] Assignee: UOP, Des Plaines, Ill.

[*] Notice: The portion of the term of this patent subsequent to Feb. 4, 2003 has been disclaimed.

[21] Appl. No.: 156,149

[22] Filed: Feb. 16, 1988

Related U.S. Application Data

[63] Continuation-in-part of Ser. No. 835,403, Mar. 3, 1986, abandoned.

[51] Int. Cl.[4] .............................................. C02F 9/00
[52] U.S. Cl. ..................................... 210/737; 210/766; 210/774; 210/804; 210/808; 210/908; 210/909
[58] Field of Search ................ 208/262; 210/749, 757, 210/765, 766, 908, 909, 737, 774, 804, 808

[56] References Cited

U.S. PATENT DOCUMENTS

| | | | |
|---|---|---|---|
| 3,453,206 | 7/1969 | Gatsis | 208/210 |
| 3,501,396 | 3/1970 | Gatsis | 208/216 |
| 3,595,931 | 7/1971 | Hay et al. | 260/668 |
| 3,855,347 | 12/1974 | Oricchio | 260/683.9 |
| 3,919,398 | 11/1975 | Davis | 423/481 |
| 4,139,453 | 2/1979 | Hutchings | 208/213 |
| 4,351,978 | 9/1982 | Hatano et al. | 585/469 |
| 4,560,466 | 12/1985 | Kukes et al. | 208/89 |
| 4,661,256 | 4/1987 | Johnson | 210/634 |
| 4,758,346 | 7/1988 | Johnson | 210/638 |

Primary Examiner—Ivars Cintins
Attorney, Agent, or Firm—Thomas K. McBride; John G. Tolomei; John G. Cutts, Jr.

[57] ABSTRACT

A process for detoxifying a high aqueous content hazardous waste stream having a water content greater than about 70 weight percent and comprising halogenated hydrocarbonaceous compounds which comprises the steps of: (a) contacting the hazardous waste stream containing halogenated hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of the halogenated hydrocarbonaceous compounds which conditions include a pressure from about 100 psig (2068 kPa gauge) to about 5000 psig (34475 kPa gauge), a maximum catalyst temperature from about 250° F. (121° C.) to about 850° F (454° C.) and a hydrogen circulation rate from about 200 SCFB (35.6 std. m³/m³) to about 10,000 SCFB (1778 std. m³/m³); and (b) separating the effluent from the hydrotreating reaction zone in a gravitational separation zone to provide a hydrogenated hydrocarbonaceous stream and a detoxified aqueous stream.

8 Claims, 1 Drawing Sheet

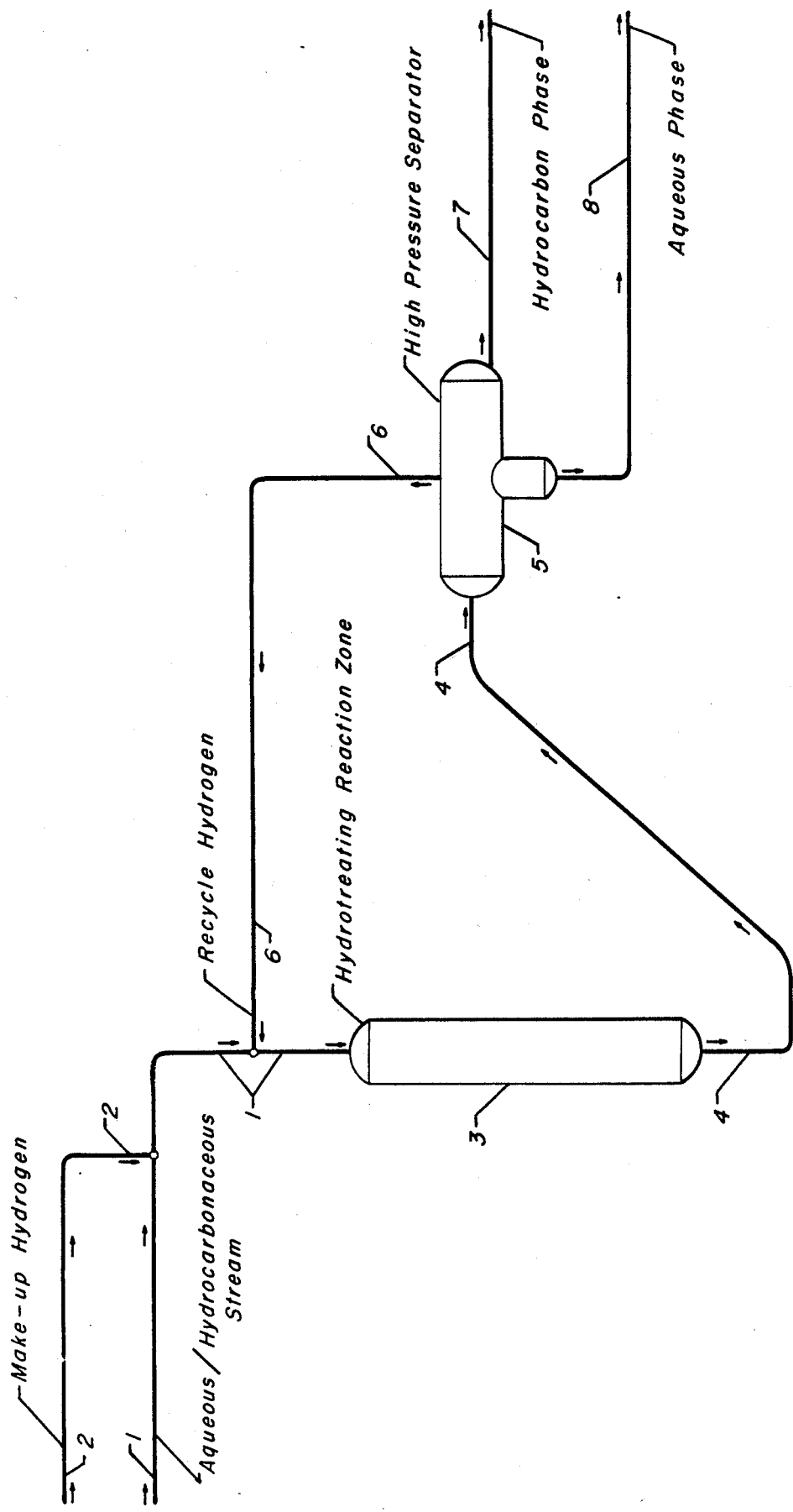

PROCESS FOR DETOXIFYING HIGH AQUEOUS CONTENT HAZARDOUS WASTE STREAMS

CROSS REFERENCE TO RELATED APPLICATION

This application is a continuation-in-part of U.S. application Serial No. 835,403, filed Mar. 3, 1986, now abandoned, all the teachings of which are incorporated by reference.

BACKGROUND OF THE INVENTION

The field of art to which this invention pertains is the detoxification of high aqueous content hazardous waste streams. More particularly, the invention relates to the conversion and removal of hydrocarbonaceous compounds contained in high aqueous content hazardous waste streams which are hazardous or otherwise obnoxious. More specifically, the invention relates to a process for detoxifying a high aqueous content hazardous waste stream having a water content greater than about 70 weight percent and comprising halogenated hydrocarbonaceous compounds which comprises the steps of: (a) contacting the hazardous waste stream containing halogenated hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of the halogenated hydrocarbonaceous compounds which conditions include a pressure from about 100 psig (2068 kPa gauge) to about 5000 psig (34475 kPa gauge), a maximum catalyst temperature from about 250° F. (121° C.) to about 850° F. (454° C.) and a hydrogen circulation rate from about 200 SCFB (35.6 std. m³/m³) to about 10,000 SCFB (1778 std. m³/m³); and (b) separating the effluent from the hydrotreating reaction zone in a gravitational separation zone to provide a hydrogenated hydrocarbonaceous stream and a detoxified aqueous stream.

INFORMATION DISCLOSURE

In U.S. Pat. No. 3,453,206 (Gatsis), a method is disclosed for hydrorefining an asphaltene-containing hydrocarbon charge stock with water in an amount of from 2% to 30% by weight of the liquid charge stock and hydrogen in a reaction zone containing a hydrorefining catalytic composite at hydrorefining conditions.

In U.S. Pat. No. 3,501,396 (Gatsis), a method is disclosed for desulfurizing an asphaltene-containing black oil which comprises admixing said black oil with from about 2 to about 30% by weight of water, reacting the resulting mixture with hydrogen in contact with a catalytic composite from about 0.2 to about 10% by weight of nickel and about 1% to about 20% by weight of molybdenum combined with an alumina-silica carrier material at a desulfurizing temperature in the range of from above the critical temperature of water to about 800° F., a pressure within the range of 1000 to about 2500 psig and a liquid hourly space velocity from about 0.5 to about 2 and recovering the black oil reduced in sulfur content and containing a lesser quantity of asphaltene.

In U.S. Pat. No. 4,139,453 (Hutchings), a method is disclosed for desulfurizing and hydrorefining an asphaltene-containing black oil with hydrogen in contact with a colloidally dispersed vanadium catalyst in admixture with 2 weight percent to 30 weight percent water based on the weight of the oil.

In U.S. Pat. No. 4,560,466 (Kukes et al), a process is disclosed for removing metals from hydrocarbon feed streams wherein the hydrocarbon is admixed with water to provide a liquid volume ratio of water to hydrocarbon from about 1:50 to about 1:1 and contacting the mixture under demetallizing conditions with hydrogen gas and a catalyst composition comprising $AlPO_4$ and a Group VI-B metal. The '466 patent teaches away from the use of more than 50 volume percent water because of the disadvantages which would accrue to the patented process.

In U.S. Pat. No. 4,351,978 (Hatano et al), a process is disclosed for dechlorinating polychlorinated biphenyls (PCB) by catalytic hydrogenation in the presence of a basic compound whereby the water content of the feed may be relatively high, the PCB is dispersed in an alkaline aqueous solution by employing an emulsifying-dispersing agent before hydrogenation and the products of the hydrogenation are separated by fractional distillation. In accordance with the '978 patent, it is essential to emulsify and disperse the PCB in an alkaline aqueous solution to enable the PCB to react with hydrogen effectively. The '978 patent teaches that experimentation has found that the metallic hydrogenation catalyst needs the continuous addition of alkali in order to obtain a suitable metallic hydrogenation catalyst life. Therefore, the '978 patent apparently requires a co-catalyst of alkali which implies that the invention is a base catalyzed system. A disadvantage of the '978 patent is the inherent creation of another hazardous waste stream comprising excess base and the emulsifying agent which is recovered.

In U.S. Pat. No. 3,595,931 (Hay et al), a process is disclosed for the replacement of a halogen moiety on a halogenated aromatic compound with a hydrogen. This process involves contacting an anhydrous halogenated aromatic compound in the vaporous phase in the presence of hydrogen with a supported catalyst containing platinum or palladium and a minor amount of an alkali or alkaline earth metal hydroxide. The primary discovery of the '931 patent appears to be that the platinum and palladium catalysts can be improved for the hydrogenolysis of aromatic halides by treating the catalyst with an alkali or alkaline earth metal hydroxide. Since a preferred method of placing the metal hydroxide on the catalyst is to contact the support with an aqueous solution of the metal hydroxide and then drying the catalyst, the conversion process must necessarily be conducted in an anhydrous manner to preclude the leaching of the desired metal hydroxide component.

In U.S. Pat. No. 3,855,347 (Oricchio), a process is disclosed for the anhydrous hydrogenation of aromatic halide compounds utilizing a catalyst comprising refractory inorganic oxides and at least one metallic catalyst component. The primary discovery of the '347 patent appears to be a catalyst which is particularly well-suited for the intended hydrogenation.

As disclosed hereinabove, the hydrorefining of asphaltene-containing hydrocarbon charge stock with water in an amount up to about 50 weight percent based on the hydrocarbon charge stock is well known. However, water usage of greater than 50 volume percent is discouraged because of the disadvantages which would accrue according to U.S. Pat. No. 4,560,466 (Kukes et al). According to U.S. Pat. No. 4,560,466, it is believed that the addition of water retards the deactivation of the AlPO$_4$-containing catalyst caused by the deposition of coke and other deposits in the pores of the catalyst and further that water helps keep the surface and pores of the catalyst clean, e.g., by gasification of some formed coke deposits. The '466 patent also teaches that even though it may be possible to carry out the hydrodemetallization of heavy asphaltene-containing oil with more than 50 volume percent water, this mode of operation would generally be economically unfavorable because of higher energy and capital investment costs for heating the added liquid water.

The patents delineated hereinabove failed to teach a process for the removal of water-soluble hydrocarbonaceous compounds from an aqueous stream. Nor do these patents teach a process for detoxifying a high aqueous content hazardous waste stream having a water content greater than about 70 weight percent and comprising hydrocarbonaceous compounds.

BRIEF SUMMARY OF THE INVENTION

The invention provides a process for the removal of water-soluble hydrocarbonaceous compounds from an aqueous stream by contacting the aqueous stream with a hydrogenation catalyst in the presence of hydrogen and in the absence of a basic compound in a hydrotreating reaction zone whereby at least a portion of the water-soluble hydrocarbonaceous compounds are converted into water-insoluble hydrocarbonaceous compounds which are more readily separated from water by means of settling or any other phase separation. The present invention also contemplates the detoxification of high aqueous content hazardous waste streams by means of contacting said waste streams in tee presence of hydrogen and in the absence of a basic compound with a hydrogenation catalyst in a hydrotreating reaction zone.

One broad embodiment of the invention may be characterized as a process for detoxifying a high aqueous content hazardous waste stream having a water content greater than about 70 weight percent and comprising halogenated hydrocarbonaceous compounds which comprises the steps of: (a) contacting the hazardous waste stream containing halogenated hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of the halogenated hydrocarbonaceous compounds which conditions include a pressure from about 100 psig (2068 kPa gauge) to about 5000 psig (34475 kPa gauge), a maximum catalyst temperature from about 250° F. (121° C.) to about 850° F. (454° C.) and a hydrogen circulation rate from about 200 SCFB (35.6 std. m$^3$/m$^3$) to about 10,000 SCFB (1778 std. m$^3$/m$^3$) and (b) separating the effluent from the hydrotreating reaction zone in a gravitational separation zone to provide a hydrogenated hydrocarbonaceous stream and a detoxified aqueous stream.

Another embodiment of the invention may be characterized as a process for the removal of water-soluble hydrocarbonaceous compounds from an aqueous stream having a water content greater than about 70 weight percent which comprises the steps of: (a) contacting the aqueous stream containing water-soluble hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of the water-soluble hydrocarbonaceous compounds which conditions include a pressure from about 100 psig (2068 kPa gauge) to about 5000 psig (34475 kPa gauge), a maximum catalyst temperature from about 250° F. (121° C.) to about 200 SCFB (35.6 std. m$^3$/m$^3$) to about 10,000 SCFB (1778 std. m$^3$/m$^3$); and (b) separating the effluent from the hydrotreating reaction zone in a gravitational separation zone to provide a hydrogenated hydrocarbonaceous stream and an aqueous stream having a reduced concentration of water-soluble hydrocarbonaceous compounds.

Other embodiments of the subject invention encompass further details such as specific aqueous streams containing hydrocarbonaceous compounds and toxic high aqueous content hazardous waste streams which are suitable charge stocks, hydrotreating catalysts and operating conditions, all of which are hereinafter disclosed in the following discussion of each of these facets of the invention.

BRIEF DESCRIPTION OF THE DRAWING

The drawing is a simplified process flow diagram of a preferred embodiment of the present invention.

DETAILED DESCRIPTION OF THE INVENTION

There is a steadily increasing demand for technology which is capable of eliminating hydrocarbonaceous compounds from aqueous streams such as waste water and potable water, for example. In one aspect, there is a demand for treating aqueous streams which contain trace quantities of organic compounds such as hydrocarbonaceous compounds after the aqueous phase has been decanted from an organic phase. Before waste water can be discharged into the environment, these trace quantities of hydrocarbonaceous compounds must be reduced or eliminated. In the event that these trace hydrocarbonaceous compounds are toxic, carcinogenic or otherwise obnoxious, it is preferred that the hydrocarbonaceous compounds not only be removed from the aqueous phase but converted into less noxious compounds. Therefore, those skilled in the art have sought to find feasible techniques to remove trace amounts of hydrocarbonaceous compounds from an aqueous phase without the generation of additional undesirable streams. In another aspect, there is a demand for technology which is capable of removing hydrocarbonaceous compounds from an aqueous stream when the hydrocarbonaceous compounds are in actual solution or when the hydrocarbonaceous compounds are entrained, emulsified or otherwise in admixture with the aqueous stream.

The use of high water content aqueous charge streams has not been considered during the development and evolution of hydroprocessing technology. A hydrocarbon refiner would have no reason to charge a high water content stream to a hydrorefining unit because of problems such as a high level of corrosion in a system typically not designed for high water content, rapid hydrothermal aging of the catalyst bed with a subsequent increase in operating costs and unpredictable conversion rates caused by steam-induced variable residence times.

The prior art as disclosed herein fails to teach or suggest the process of the present invention. We have discovered a novel process for detoxifying high aqueous content hazardous waste streams containing hydrocarbonaceous compounds without the use of an alkali or base catalyzed system and its attendant disadvantages.

The present invention provides an improved process for detoxifying high aqueous content hazardous waste streams containing hydrocarbonaceous compounds. A wide variety of hydrocarbonaceous compounds are to be considered candidates for conversion and/or detoxification in accordance with the process of the present invention. Examples of hydrocarbonaceous compounds which are suitable for treatment by the process of the present invention are halogenated hydrocarbons. Certain halogenated hydrocarbons having demonstrated or potential toxicity include but are not limited to kepone, halogenated biphenyls, halogenated cyclodienes, such as aldrin, dieldrin, and hexachlorocyclopentadiene, dibromochloropropane, halogenated phthalic anhydrides, such as polybromophthalic anhydride, tetrachloroethylene, polychlorodioxins such as tetrachlorodibenzodioxin, halogenated organic phosphates such as 2,2,dichlorovinyldimethyl phosphate. Additional examples of compounds which are suitable for treatment include organometallic compounds and especially those which contain metals such as lead, mercury, cadmium, cobalt, arsenic, vanadium, and chromium. Contaminating hydrocarbonaceous compounds may contain sulfur, oxygen, metal or nitrogen components. In the event that the hydrocarbonaceous compound is soluble in the aqueous solution, the present invention is particularly beneficial in that the soluble hydrocarbonaceous compound such as for example alcohol may be hydrogenated to the corresponding alkane and thereby be readily separable from the aqueous stream. In accordance with the present invention, generally any hydrocarbonaceous compound may be converted or detoxified.

In accordance with one embodiment of the present invention wherein the high aqueous content waste stream is primarily present in an aqueous phase and a hydrocarbonaceous phase, it is preferred that the quantities of hydrocarbonaceous compounds are present in the aqueous stream in an amount less than about 30 weight percent. In accordance with another embodiment of the invention wherein the aqueous stream contains water-soluble hydrocarbonaceous compounds, the amount of water-soluble hydrocarbonaceous compounds may be at any suitable level with a preferred amount of less than about 30 weight percent based on the aqueous stream.

In accordance with the subject invention, an aqueous stream containing hydrocarbonaceous compounds is introduced into a hydrotreating or hydrogenation zone and is contacted with a hydrogen-rich gaseous phase and a hydrogenation catalyst in the absence of a basic compound. The catalytic hydrogenation zone may contain a fixed, ebullated or fluidized catalyst bed. This reaction zone is preferably maintained under an imposed pressure from about 100 psig (2068 kPa gauge) to about 5000 psig (34475 kPa gauge) and more preferably under a pressure from about 200 psig (1379 kPa gauge) to about 1800 psig (12411 kPa gauge). Suitably, such reaction is conducted with a maximum catalyst bed temperature in the range of about 250° F. (121° C.) to about 850° F. (454° C.) selected to perform the desired conversion to reduce or eliminate the undesirable characteristics or components of the hydrocarbonaceous portion of the charge stock. Further preferred operating conditions include liquid hourly space velocities in the range from about 0.2 hrs$^{-1}$ to about 10 hrs$^{-1}$ and hydrogen circulation rates from about 200 standard cubic feet per barrel (SCFB) (35.6 m$^3$/m$^3$) to about 10,000 SCFB (1778 m$^3$/m$^3$), preferably from about 300 SCFB (53.3 m$^3$/m$^3$) to about 8000 SCFB (1422 m$^3$/m$^3$).

The preferred catalytic composite disposed within the hereinabove described hydrogenation zone can be characterized as containing a metallic component having hydrogenation activity, which component is combined with a suitable refractory carrier material of either synthetic or natural origin. The precise composition and method of manufacturing the carrier material is not considered essential to the present invention. Preferred carrier materials are carbon, alumina, silica and mixtures thereof. Suitable metallic components having hydrogenation activity are those selected from the group comprising the metals of Groups VI-B and VIII of the Periodic Table, as set forth in the Periodic Table of the Elements, E.H. Sargent and Company, 1964. Thus, the catalytic composites may comprise one or more metallic components from the group of molybdenum, tungsten, chromium, iron, cobalt, nickel, platinum, iridium, osmium, rhodium, ruthenium, and mixtures thereof. The concentration of the catalytically active metallic component, or components, is primarily dependent upon a particular metal as well as the physical and/or chemical characteristics of the particular hydrocarbon feedstock. For example, the metallic components of Group VI-B, when selected, are generally present in an amount within the range of from about 1 to about 20 weight percent, the iron-group metals, when selected, in an amount within the range of about 0.2 to about 10 weight percent, whereas the noble metals of Group VIII, when selected, are preferably present in an amount within the range of from about 0.1 to about 5 weight percent, all of which are calculated as if these components existed within the catalytic composite in the elemental state. The metal component of the hydrogenation catalyst may optinally be sulfided as required or desired. In addition, any catalyst employed commercially for hydrotreating middle distillate hydrocarbonaceous compounds to remove nitrogen and sulfur should normally function effectively in the hydrogenation zone of the present invention.

The resulting effluent from the hydrogenation zone is cooled and admitted to a gravitational separation zone. Depending upon the composition of the aqueous feed stream, a separation is conducted in this gravitational separation zone in order to produce a detoxified aqueous stream having a reduced hydrocarbonaceous compound concentration, a hydrogenated hydrocarbonaceous phase and a hydrogen-rich gaseous phase. The gravitational separation may be conducted with any known and convenient techniques which include settling and centrifugation. In a preferred embodiment of the present invention the hydrogen-rich gaseous phase may be recycled to the inlet of the hydrotreating reaction zone. In the event that this hydrogen-rich gaseous stream contains hydrogen sulfide, or normally gaseous hydrocarbonaceous compounds, it may be desirable to remove these compounds from the hydrogen-rich gaseous phase before it is recycled. Under certain circumstances, such as, for example, to enhance the hydrogenation catalyst activity, a portion of the hydrogenated hydrocarbonaceous phase may be recycled to the hydrogenation zone.

In the drawing, the process of the present invention is illustrated by means of a simplified flow diagram in which such details as pumps, instrumentation, heat-exchange and heat-recovery circuits, compressors and similar hardware have been deleted as being non-essential to an understanding of the techniques involved. The use of such miscellaneous appurtenances are well within the purview of one skilled in the art.

With reference now to the drawing, an aqueous feedstock containing hydrocarbonaceous compounds is introduced into the process via conduit 1 and subsequently passed to hydrotreating reaction zone 3. Make-up hydrogen is introduced via conduit 2 and conduit 1 into hydrotreating reaction zone 3. A hydrogen-rich gaseous stream which is derived in a manner hereinafter described is introduced via conduits 6 and 1 into hydrotreating reaction zone 3. The aqueous charge stock containing hydrocarbonaceous compounds is hydrotreated in hydrotreating reaction zone 3 in the presence of a hydrogenation catalyst maintained at hydrogenation conditions as described hereinabove including the absence of a basic compound. The resulting hydrotreated aqueous charge stock and a gaseous phase are removed from hydrotreating reaction zone 3 via conduit 4 and are introduced into high pressure separator 5. A hydrogen-rich gaseous phase is removed from high pressure separator 5 via conduit 6 and recycled as described hereinabove. A detoxified aqueous stream having a reduced concentration of hydrocarbonaceous compounds is removed from high pressure separator 5 via conduit 8 and recovered. A detoxified and hydrogenated hydrocarbonaceous stream is removed from high pressure separator 5 via conduit 7 and recovered.

The process of the present invention is further demonstrated by the following example. This example is however not presented to unduly limit the process of this invention, but to further illustrate the advantages of the hereinabove described embodiments.

EXAMPLE

This example describes the processing of an aqueous hazardous waste stream containing 80 weight percent water, 19.8 weight percent transformer oil and 0.2 weight percent 1,1,1-trichloroethane which is considered to be a toxic waste. The hereinabove described hazardous waste stream was introduced into a hydrotreating reaction zone containing a hydrogenation catalyst in the presence of hydrogen and in the absence of a basic compound at operating conditions which included a catalyst temperature of 608° F. (320° C.), a pressure of 500 psig (3447 kPa gauge), a liquid hourly space velocity (LHSV) of 3 and a hydrogen circulation rate of 2500 standard cubic feet per barrel (444 std m³/m³). The hydrogenation catalyst contained a silica-alumina support with nickel and molybdenum deposited thereon. The hydrotreating reaction zone was also charged with di-tertiary butyl disulfide in an amount of 500 ppm based on the hazardous waste stream in order to ensure that the hydrogenation catalyst was maintained in the sulfided state.

After steady state operation was achieved, the resulting effluent from the hydrotreating reaction zone was analyzed and found to contain less than 1 part per billion of 1,1,1,-trichloroethane or a removal efficiency of 99.99995%. The recovered aqueous stream was found to contain about 1 ppm of hydrocarbonaceous compounds.

The hereinabove described example successfully demonstrates that hydrotreating of an aqueous stream having a water content greater than about 70 weight percent can be utilized to remove hydrocarbonaceous compounds from the aqueous stream and to detoxify the aqueous hazardous waste stream.

The foregoing description, drawing and example clearly illustrate the advantages encompassed by the process of the present invention and the benefits to be afforded with the use thereof.

We claim:

1. A process for detoxifying a high aqueous content hazardous waste stream having a water content greater than about 70 weight percent and comprising halogenated hydrocarbonaceous compounds which comprises the steps of:
   (a) contacting said high aqueous content hazardous waste stream having a water content greater than about 70 weight percent and comprising halogenated hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of said halogenated hydrocarbonaceous compounds which conditions include a pressure from about 100 psig (2068 kPa gauge) to about 5000 psig (34475 kPa gauge), a maximum catalyst temperature from about 250° F. (121 20 C.) to about 850° F. (454° C.) and a hydrogen circulation rate from about 200 SCFB (35.6 std. m³/m³) to about 10,000 SCFB (1778 std. m³/m³); and
   (b) separating the effluent from said hydrotreating reaction zone in a gravitational separation zone to provide a hydrogenated hydrocarbonaceous stream and a detoxified aqueous stream.

2. The process of claim 1 wherein said hazardous waste stream comprises organometallic compounds.

3. The process of claim 1 wherein said hydrogenation catalyst is sulfided.

4. The process of claim 1 wherein said refractory support is selected from the group consisting of silica, alumina, carbon and mixtures thereof.

5. A process for the removal of water-soluble hydrocarbonaceous compounds from an aqueous stream having a water content greater than about 70 weight percent which comprises the steps of:
   (a) contacting said aqueous stream having a water content greater than about 70 weight percent and containing water-soluble hydrocarbonaceous compounds in the presence of hydrogen and in the absence of a basic compound with a hydrogenation catalyst comprising a refractory support and at least one metal having hydrogenation activity and which metal is selected from the metals of Groups VI-B and VIII of the Periodic Table in a hydrotreating reaction zone operated at conditions selected to hydrogenate at least a portion of said water-soluble hydrocarbonaceous compounds which conditions include a pressure from about 100 psig (2068 kPa gauge) to about 5000 psig (34475 kPa gauge), a maximum catalyst temperature from about 250° F. (121° C.) to about 850° F. (454° C.)

and a hydrogen circulation rate from about 200 SCFB (35.6 std. m³/m³) to about 10,000 SCFB (1778 std. m³/m³); and (b) separating the effluent from said hydrotreating reaction zone in a gravitational separation zone to provide a hydrogenated hydrocarbonaceous stream and an aqueous stream having a reduced concentration of water-soluble hydrocarbonaceous compounds.

6. The process of claim 5 wherein said aqueous stream comprises organometallic compounds.

7. The process of claim 5 wherein said hydrogenation catalyst is sulfided.

8. The process of claim 5 wherein said refractory support is selected from the group consisting of silica, alumina, carbon and mixtures thereof.

* * * * *